Sept. 10, 1946.  C. E. POLLARD  2,407,447
FIFTH WHEEL MECHANISM FOR TRACTORS
Filed Aug. 23, 1944  2 Sheets-Sheet 1
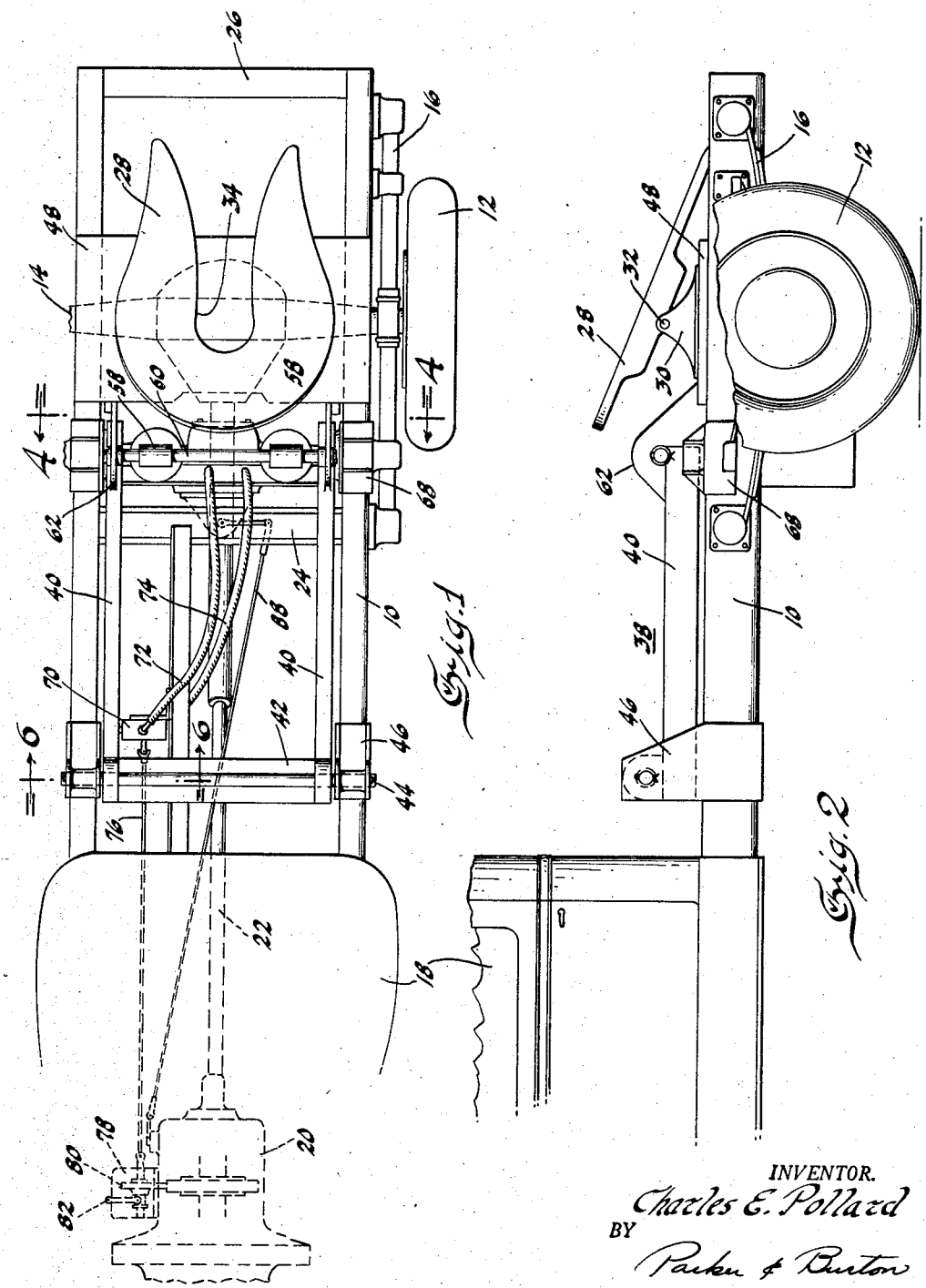
INVENTOR.
Charles E. Pollard
BY
Parker & Burton
ATTORNEYS

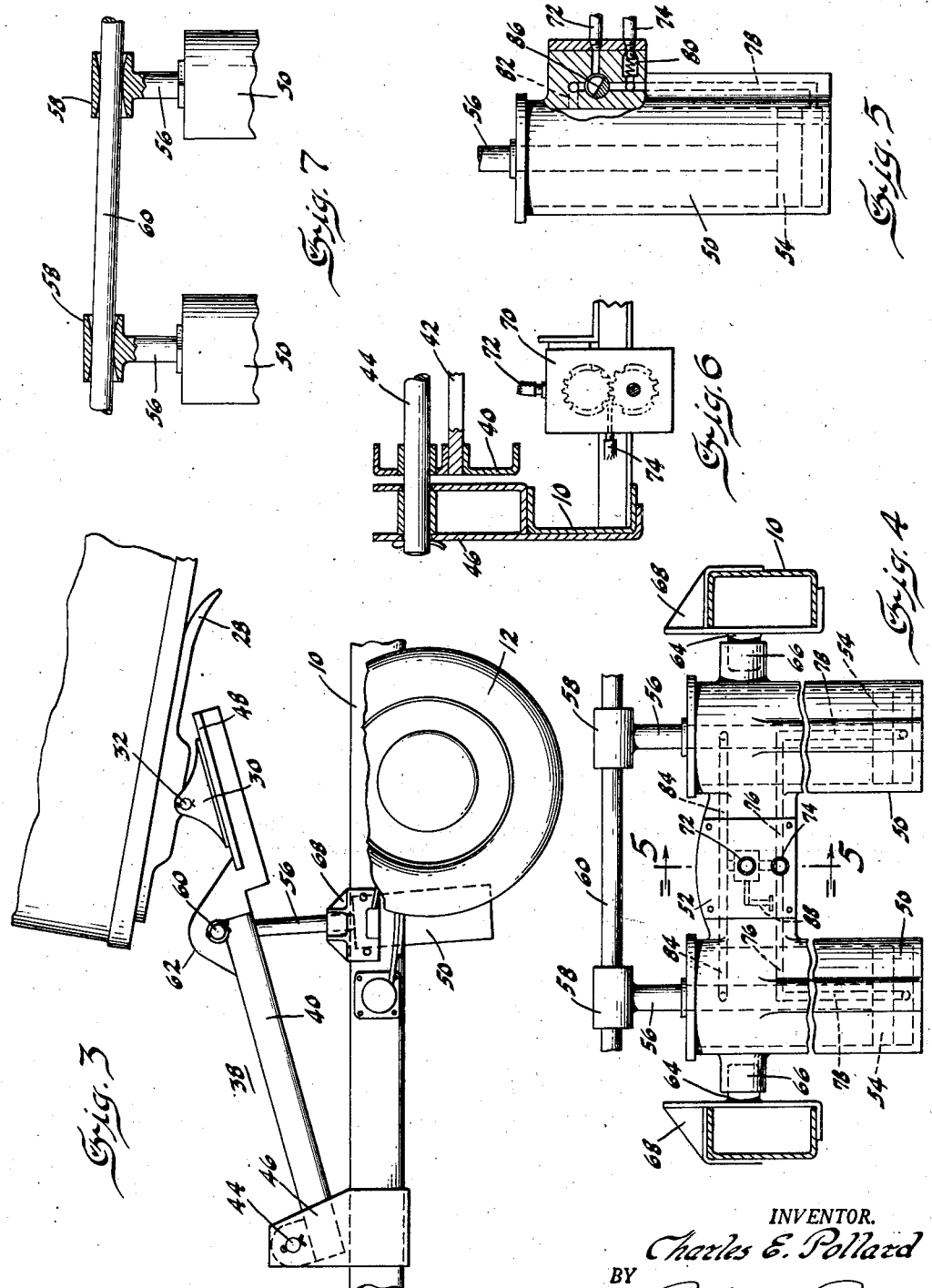

Patented Sept. 10, 1946

2,407,447

UNITED STATES PATENT OFFICE 2,407,447

FIFTH WHEEL MECHANISM FOR TRACTORS

Charles E. Pollard, Detroit, Mich.

Application August 23, 1944, Serial No. 550,687

5 Claims. (Cl. 280—33.1)

This invention relates to improved fifth wheel mechanism for a tractor. More specifically it relates to the mounting or support for fifth wheel mechanism for a tractor.

The conventional fifth wheel devices which are supported upon tractors and are adapted to engage the coupling pin of a trailer are commonly supported to slope downwardly and rearwardly whereby the coupling pin depending from the front end of the trailer may ride into the provided socket of the fifth wheel device as the tractor is backed underneath the elevated front end of the trailer. The slope of the fifth wheel device lifts the front end of the trailer off the ground as the tractor is backed thereunder. The fifth wheel device is so mounted upon the tractor as to tilt about a horizontal axis. The connection between the coupling pin on the trailer and the socket in the fifth wheel device on the tractor permits free angular turning of the trailer with respect to the tractor. This construction above described is conventional and is found on practically all tractors equipped with a fifth wheel device.

When a trailer is brought in by a road tractor to a loading or unloading dock, it is frequently impossible to position the trailer at the dock at the time it is brought in from the road. In order not to delay the road tractor, the trailer is commonly disconnected therefrom and is later moved up to the loading dock by a yard tractor. Limitation of dock space makes this practice essential. Each trailer is provided at the front end with a retractable pair of wheel or dolly structure which is held elevated when the trailer is being moved by the tractor but which is lowered to contact the ground and to support the front end of the trailer when the trailer is separated from the tractor. It is the present practice to raise and lower these dolly wheels by hand through provided crank mechanism.

When a trailer is brought into the storage yard by a highway tractor, the dolly is lowered to support the front end of the trailer to permit disconnection of the trailer from the tractor. When the yard tractor is hooked on to the trailer to move it about the yard, the dolly wheels must be raised out of the way before the trailer is moved by the tractor. When the trailer has been moved to the loading dock the dolly wheels must again be lowered before the trailer is disconnected from the tractor.

An object of this invention is to provide a fifth wheel mounting or support on a yard tractor whereby when a trailer is coupled therewith it is not necessary to retract the dolly wheels to move the trailer but, through the operation of the fifth wheel mounting, the fifth wheel device itself is elevated with respect to the tractor a distance sufficient to elevate the front end of the trailer so as to lift the dolly wheels off the ground in order that the trailer may be moved. When the trailer has been moved, the fifth wheel device is lowered, bringing the dolly wheels in contact with the ground and the tractor is disconnected. Two operations, namely; retracting the dolly wheels upon connection of the trailer with the yard tractor and lowering the dolly wheels upon disconnection of the trailer therefrom are therefore eliminated.

The fifth wheel device is of the conventional type except that it is so supported upon the tractor that it can be raised and lowered and the draw bar pull thereon is taken by the tractor without being passed through the elevating mechanism. More particularly the fifth wheel device is mounted upon a subframe or platform, which platform is hinged to the tractor frame to rest thereupon or to be elevated thereabove. The platform superimposes the rear end portion of the tractor frame. The forward end of the platform is hinged to the frame of the tractor forwardly of the rear axle of the tractor. The fifth wheel device is mounted upon the rear end of the platform above the rear axle of the tractor.

Preferably, the mounting for the fifth wheel device includes hydraulic means in the form of a pair of hydraulic piston and cylinder assemblies supported upon the tractor frame and coupled with the platform and operable to elevate the platform and to maintain the same in the elevated position. Hydraulic feed mechanism is provided to deliver liquid under pressure into the lower ends of the two cylinders to elevate the pistons and to raise the platform which carries the fifth wheel. The platform can be raised or lowered as desired. Each piston and cylinder assembly is pivotally mounted upon the tractor and pivotally articulated with the platform to permit free swinging movement of the platform without distortion of the piston and cylinder mechanism. The vertical load or weight thrust is taken upon the cylinder and piston mechanism. The draw bar pull is taken by the hinged coupling of the platform with the tractor frame.

Specifically, the cylinders communicate with each other to permit compensating action in either one as the load may vary thereon due to uneven road conditions or relative angular disposition of the trailer with respect to the tractor. The mounting of the piston and cylinder assemblies upon the tractor and the connection therewith with the platform is such as to also permit limited relative elevation of one side of the platform with respect to the other side of the platform as the load varies on the fifth wheel device due to load or road conditions.

Other objects, advantages and meritorius features of the invention will more fully appear from the following description, appended claims and accompanying drawings, wherein:

Figure 1 is a plan of the rear end of a tractor equipped with this invention.

Fig. 2 is a side elevation of the tractor shown in Fig. 1.

Fig. 3 is a side elevation of a fragment of the structure of Fig. 2 showing the forward end of a trailer connected with the fifth wheel mechanism of the tractor and elevated.

Fig. 4 is a vertical cross section on line 4—4 of Fig. 1.

Fig. 5 is a vertical cross section on line 5—5 of Fig. 4.

Fig. 6 is a section taken on line 6—6 of Fig. 1, and

Fig. 7 is a section through the piston connecting rod.

The tractor upon which the fifth wheel mechanism is mounted has a frame 10 and rear wheels 12 mounted upon opposite ends of the rear axle 14 and coupled with the tractor frame by supporting springs 16. The tractor is provided with a cab 18 and conventional transmission mechanism 20 coupled through a driving shaft 22 with the rear axle driving mechanism. The tractor frame is provided with cross frame members 24 and 26 and a fifth wheel plate 28 supported upon a base 30 for tilting movement about a horizontal axis 32.

The fifth wheel device is of a conventional character so far as described above and the tractor, so far as above described, is also conventional. The fifth wheel plate normally occupies the tilted position shown in Fig. 2 and is provided with a socket opening 34 adapted to receive the coupling pin of a trailer to couple the trailer pivotally thereto for manipulation by the tractor.

My invention resides primarily in the mounting or assembling of this fifth wheel device upon the tractor to be operated as hereinafter set forth. I provide a frame or platform indicated generally as 38 in Fig. 2 which is pivoted to the tractor frame at its forward end for swinging movement and which carries upon its rear end portion a fifth wheel device. This platform includes a pair of side rails 40 held in spaced apart relationship at the forward end by a cross frame member 42 and pivotally supported at the forward end upon a shaft or axle 44, the ends of which are mounted in brackets 46 secured to the tractor frame 10. This platform may therefore be raised and lowered, swinging about the axle 44. The base 30 of the fifth wheel device is mounted upon a cross frame member 48 which extends between the side rails 40 of the platform at the rear end of the platform as shown in Figs. 1, 2 and 3. The rear ends of the side rails 40 are depressed so that the fifth wheel device is supported approximately on a level with the top of the side frame members 10 of the tractor.

Hydraulic mechanism in the form of a pair of hydraulic piston and cylinder assemblies is mounted upon the tractor and coupled with the platform to swing the rear end of the platform upwardly and to maintain it in such elevated position as shown in Fig. 3. This hydraulic mechanism is mounted immediately rearwardly of the cross frame member 24 as shown in Fig. 1. The hydraulic mechanism consists of a pair of hydraulic cylinders 50 connected at their upper ends by a communicating manifold 52 to form a unit. Within each cylinder is mounted a piston 54 provided with a piston rod 56. The upper ends of the piston connecting rods 56 are cored out to provide interiorly arcuate shaped bearing portions 58 through which a cross shaft 60 extends. The ends of the shaft 60 are pivoted within brackets 62 carried by the frame members 40 of the platform.

A female socket 66 projects from each of the two opposite sides of the cylinder unit and is mounted for rotation upon a stub shaft 64 carried by a bracket 68 mounted upon the tractor frame 10 whereby the two cylinder unit may swing about a horizontal axis between the side frame members 10 of the tractor, as shown in Fig. 3, as the platform is elevated.

The pistons within the cylinders are adapted to be actuated by liquid supplied to the two cylinders from a hydraulic pump 70 mounted upon the tractor as shown in Fig. 1. The pump has two hydraulic leads 72 and 74 which extend from the pump to the manifold 52 between the two cylinders and which communicate with the cylinders as hereinafter described to control the movement of the pistons. This pump may be a conventional gear pump such as is used on truck dump bodies provided with hydraulic operating mechanism and may be coupled in a similar manner with the transmission gearing 20 through a shaft 76 which extends from the pump to an attachment 78 mounted upon the side of a transmission casing as shown in Fig. 1. This attachment includes a gear 80 mounted upon a drive shaft 76 and adapted to be moved by an operating lever 82 which lever can be actuated from the cab of the tractor to throw the gear 80 into or out of driving engagement with the transmission gearing.

The outlet 74 from the pump to the manifold terminates in two branch cored out passageways 76 through the manifold (Fig. 4) which branch passageways communicate with longitudinal passageways 78 in the two cylinders. Each passageway 78 leads from a branch passageway to the bottom of its cylinder as shown in Figs. 4 and 5, whereby liquid under pressure from the pump may be delivered into the bottom of each cylinder to elevate the piston 54. The passageway 74 from the pump is provided with a spring controlled check valve 80 (Fig. 5) whereby liquid may be delivered through the passageway 74, branches 76 and passageways 78 under pressure into the cylinders but may not be returned therethrough to the pump.

A fluid passageway 82 leads from the top of each cylinder through the manifold by way of passageways 84 to the lead 72 which communicates with the pump 70. Each passageway 82 also communicates with a passageway 78 in each cylinder to permit liquid to be by-passed from the bottom to the top of the cylinder as the piston is lowered as controlled by a manually operable valve 86 (Fig. 5). The valve 86 is adapted to be actuated by a lever and linkage arrangement 88 as shown in Fig. 1, such control being available to the operator within the cab of the tractor. When the valve 86 is disposed as shown in Fig. 5, liquid may be delivered into the bottom of each cylinder to elevate the pistons to raise the platform 38 as shown in Fig. 3. Liquid from the top of each cylinder is discharged through the passageways 82, 84 and 72 back to the pump. So long as the pressure is maintained, the platform will be held elevated. Return of liquid to the pump is prevented by the check valve 80. When it is desired to lower the platform, the valve 86 may be rotated to place the passageway 82 into communication with the passageway 78 so that liquid may be by-passed from the bottom of the cylinder to the top of the cylinder. Such rotation of the valve 86 prevents return of liquid through the lead 72 to the bottom.

It will appear therefore that the pump may be driven from the transmission to deliver liquid through the manifold into the bottoms of the two cylinders to raise the pistons to swing the rear end of the platform upwardly to elevate the fifth wheel device. The platform may be held elevated as desired. The platform may be lowered through control exercised by means of the valve 86 to bring the fifth wheel device into the position shown in Fig. 2. The piston and cylinder unit pivots between the side frame members 10 of the tractor so that the downward thrust on the piston rods is always along axial lines. The piston rods are pivoted to the platform as above described and their connection with the shaft 60 is such that the thrust is always along the axial lines of the rods. The two cylinders are fed through the two branches 76 from the same line 74 from the pump so that a compensating action is maintained between the two piston and cylinder assemblies through the communicating branch lines 76 to compensate for variations in load upon these two piston and cylinder assemblies as the trailer is hauled over an uneven road. The load may also vary as regards the two sides of the platform due to the trailer being disposed at an angle to the longitudinal line of the tractor as in turning. The platform under these circumstances is subjected to a twisting distortion and within the limits of the construction is permitted to yield to this twisting force whereby one side of the platform may be displaced vertically with respect to the opposite side of the platform. This is permitted without imposing any undue bending upon the piston rod 56 by the mounting of each rod upon the shaft 60 as shown in Fig. 7.

What I claim is:

1. In fifth wheel mechanism for a tractor having a frame, a platform superimposing the rear end portion of the frame and hinged at its forward end to the frame spaced above the plane of the frame to have its rear end swung upwardly above the frame or lowered thereupon, a trailer coupling engageable fifth wheel device pivotally supported upon the rear end of the platform to rise and fall with the swingable movement of the platform, hydraulic means pivotally supported upon the tractor frame and pivotally coupled with the platform intermediate its ends to raise the rear end of the platform and to support the same in elevated position, said hydraulic means comprising two piston and cylinder assemblies one pivotally supported upon each side of the frame and pivotally connected with the platform to permit limited displacement of one side of the platform vertically relative to the other side when the platform is in the elevated position said piston and cylinder assemblies being operable to swing the rear end of the platform upwardly above the frame.

2. In fifth wheel mechanism for a tractor having a frame, a platform superimposing the rear end portion of the frame hinged at its forward end to the frame to have its rear end swung upwardly above the frame or lowered thereupon, a trailer coupling engageable fifth wheel device pivotally supported upon the rear end of the platform to rise and fall with the swingable movement of the platform, hydraulic means pivotally supported upon the tractor frame and pivotally coupled with the platform to raise the rear end of the platform and to support the same in elevated position, said hydraulic means comprising a pair of communicating piston and cylinder assemblies independently pivotally articulated with the platform to permit limited elevation of one side of the platform relative to the other.

3. In fifth wheel mechanism for a tractor having a frame, a platform superimposing the rear end portion of the frame hinged at its forward end to the frame to have its rear end swung upwardly above the frame or lowered thereupon, a trailer coupling engageable fifth wheel device pivotally supported upon the rear end of the platform to rise and fall with the swingable movement of the platform, hydraulic means supported upon the tractor frame and coupled with the platform to raise the rear end of the platform and to support the same in elevated position, said hydraulic means comprising a pair of communicating piston and cylinder assemblies, each piston and cylinder assembly being pivoted to the tractor frame to swing about a horizontal axis and pivotally articulated with the platform to swing relative thereto about a horizontal axis and to permit limited elevation of one side of the platform relative to the other.

4. In fifth wheel mechanism for a tractor having a frame provided with rear road wheels and provided with platform pivots spaced forwardly of said rear wheels, a platform superimposing that portion of the frame to the rear of said pivots and hinged at its forward end to said pivots to have its rear end swing above the rear end of the frame or to rest upon the frame, hydraulic piston and cylinder mechanism pivotally mounted upon the frame and pivotally coupled with the platform intermediate its ends to swing and to support the rear end of the platform above the frame and a fifth wheel coupling device pivotally mounted upon the rear end of the platform to engage and support the front end of a trailer for towing with the platform in the elevated position.

5. In fifth wheel mechanism for a tractor having a frame provided with rear road wheels and provided with upright standards spaced forwardly of its rear wheels, a platform superimposing that portion of the frame to the rear of said standards, said platform being hinged at its forward end to said standards above the plane of the frame to be swung to elevate its rear end above the rear end of the frame or to rest upon the frame, a hydraulic piston and cylinder assembly for each side of the frame having its cylinder pivotally mounted upon the frame intermediate the rear wheels and said standards and having its pistons pivotally coupled with the platform intermediate its ends to swing and to support the rear end of the platform spaced above the frame, a fifth wheel coupling device pivotally supported upon the rear end of the platform to engage and support the front end of a trailer for towing with the platform in the elevated position, each piston and cylinder assembly being pivoted to the tractor frame and pivoted to the platform to permit limited elevation of one side of the platform relative to the other.

CHARLES E. POLLARD.